Nov. 5, 1963  H. A. PRINTZ  3,109,268
GEM CUTTER'S DOP
Filed Dec. 6, 1960  2 Sheets-Sheet 2
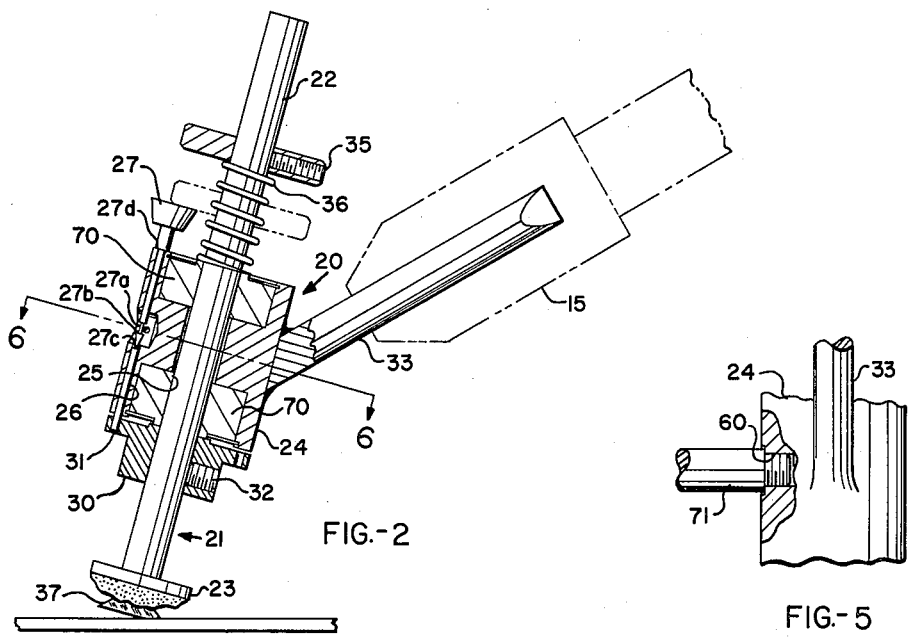
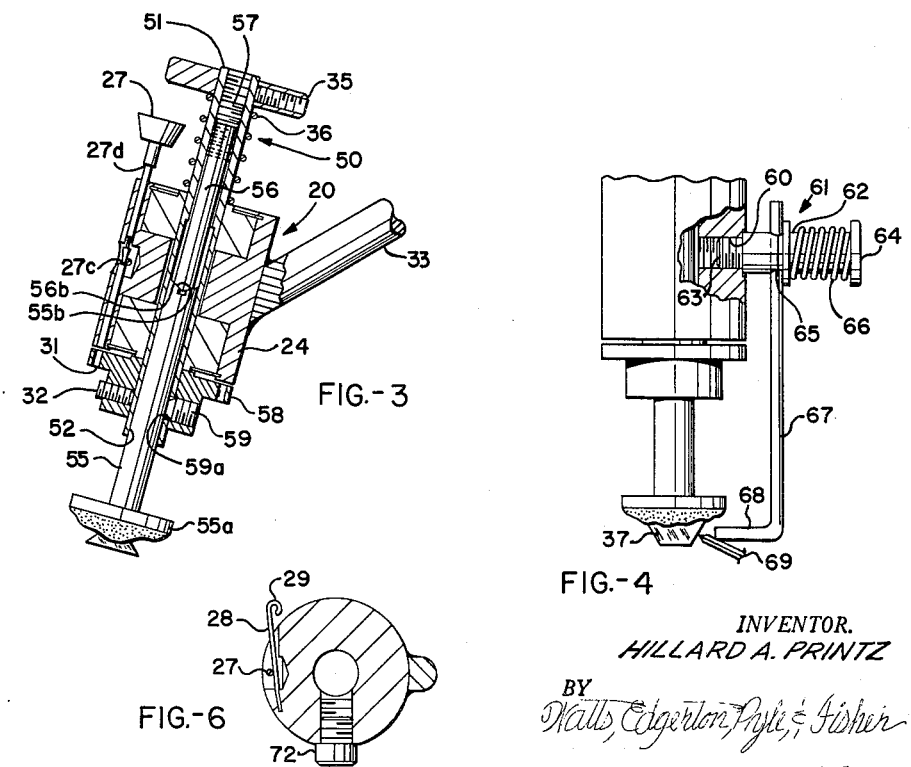
INVENTOR.
HILLARD A. PRINTZ
BY
ATTORNEY

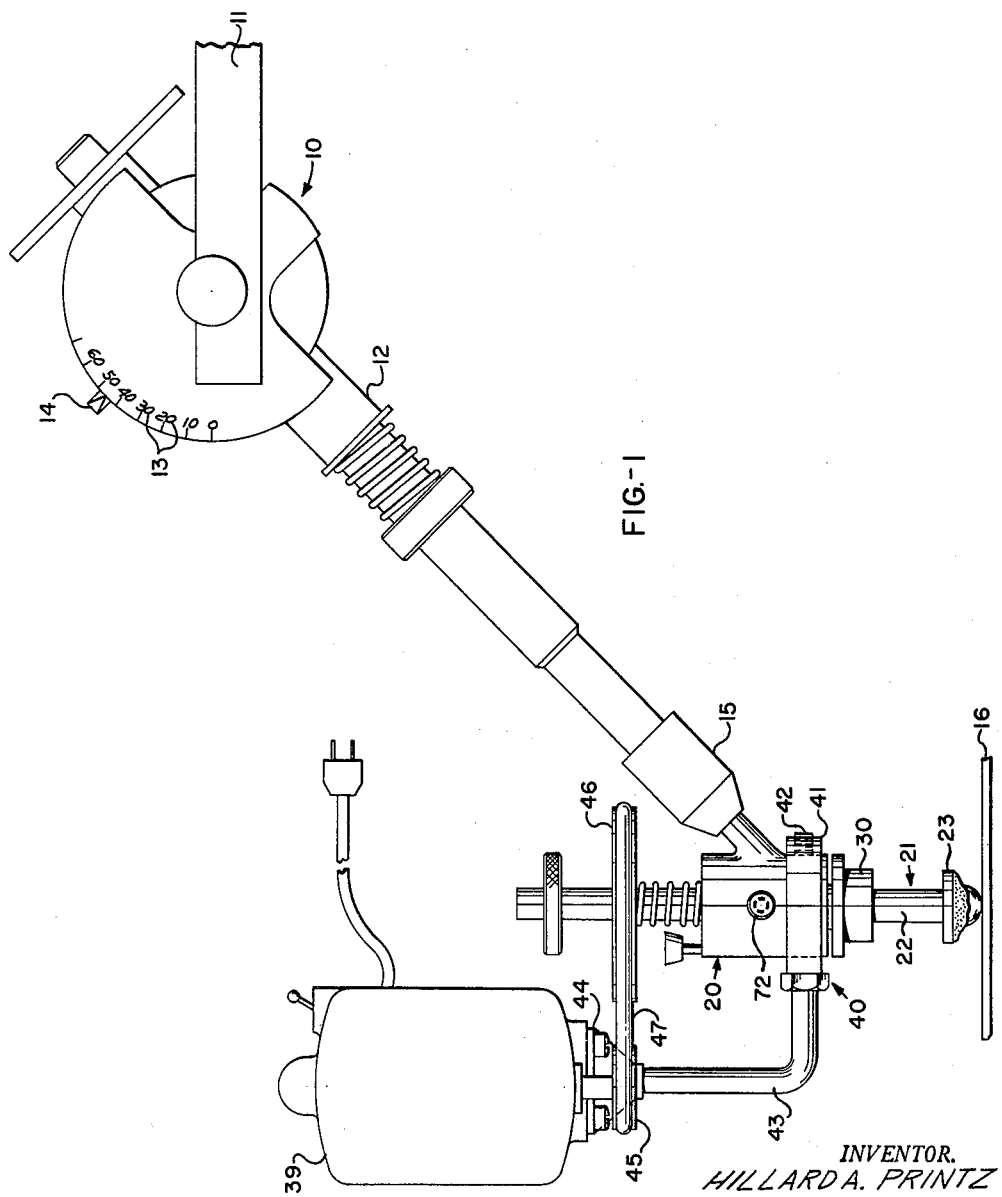

United States Patent Office 3,109,268
Patented Nov. 5, 1963

3,109,268
GEM CUTTER'S DOP
Hillard A. Printz, 201 E. Park Ave., New Castle, Pa.
Filed Dec. 6, 1960, Ser. No. 74,138
8 Claims. (Cl. 51—229)

This invention pertains to gem cutting and more particularly to a novel and improved dop for cutting gems.

In the gem cutting art a flat, rotatable disc known as a lap is employed. In diamond cutting, the lap is usually referred to as a skaif or a wheel. For gem cutting an abrasive is placed on the upper face of the lap. A rough gem to be cut is held against the face of the lap as the lap is rotated and the abrasive carried on the lap cuts away portions of the uncut gem. With sapphires and softer gems, softer abrasives are subsequently used for a polishing operation.

A mechanism known as a facet holder is often positioned adjacent the lap. The uncut gem is secured to the end of a device known as a "dop." The dop is then secured to the facet holder and the facet holder is adjusted to a selected position holding the gem against the lap for cutting and polishing.

With prior known dops, several disadvantages have been inherent. Among these was that with many prior known dops the jewel had to be removed from the dop and remounted, or the dop had to be manually moved relative to the facet holder when moving from one cutting position to another. Under these circumstances proper positioning of the jewel in a second position has depended upon the skill of the operator. With the present invention, a dop is provided which is journaled for free rotation. An indexing means is provided for selectively positioning the dop in a selected one of a plurality of positions of rotation. This provides predetermined selected indexed positions. With this structure, all facets are very accurately and precisely located and formed in perfect geometric relationship.

The dop of this invention also has the advantage that the gem carried by the dop may be rotated during a faceting operation. This not only reduces the time required for a faceting operation but also permits some types of faceting operations that have never been available before to be performed. A dop, constructed according to this invention can be used in diamond cutting to great advantage. In diamond cutting it is essential to know the grain of the diamond before a cutting operation is commenced since the cutting must occur cross grain. This grain may run in one of three ways. In a two-point stone, the grain is, as the Dutch express it, either coming in from out, or out from in. In a three-point stone the grain extends more or less in the pattern of a three-pointed star. In a so-called "four-pointed" stone, there are obviously four points in which cross grain polishing can be obtained. With all of these it is important to recognize the grain structure and it is essential to perform the cutting operation across the diamond grain. With this invention the diamond can be rotated as it is in contact with the rotating skaif. Thus, the cutting will occur cross grain several times during each rotation (twice on a two-point stone, three times on a three-point stone, etc.).

For many types of faceting, such as cones and spheres, the grain is not constant throughout the surface being so faceted, and hence the diamond must be changed in position to obtain the necessary cross grain cut. With a device of this construction, the diamond can be rotated so that proper relative movement is obtained two to four times per revolution, depending on the number of points of the stone. Instead of requiring reciprocal cutting action in each of two directions, which two directions must be discerned before the cutting is commenced, one simply rotates the stone relative to the lap and proper cutting is obtained.

Other and less apparent advantages of this invention are that gems can be duplicated more quickly and easily. Cuts and shapes not known before are easily and readily obtained. One may, for example, very easily cut conical shaped surfaces.

In diamonds with a more-or-less conventional cut where there is a flat, so-called "table facet," a generally conical shaped pavilion is symmetrical about an axis that is normal to the table facet. Usually, the tip of the pavilion is cut away forming a collet to avoid a tendency of the gem to cut or split. This collet provides a very small grain surface at the head of the pavilion. With relatively large diamonds cut in this manner a so-called "well" effect is present if the table is parallel to the collet. The well effect is the visibility of the collet through the table facet. With the dop of this invention it is a simple matter to either form a table facet of a plurality of facets that are a slight angle with one another so that the table facet is in fact really either a line or a point, or to form the table facet and collet at a slight angle with respect to each other. With either technique, the well effect is eliminated.

Another advantage of this mechanism is that the rotatable dop can readily and easily be powered to speed cutting operations and to obtain the various other advantages of rotating the jewel relative to the lap. Powering the dop will, for example, make the cutting of conical shapes fast and simple. The girdle can easily be trued and the bizet, crown and pavilion polished.

The dop of this invention has a spindle, journaled in a housing. The housing includes an arm extending outwardly at an angle which is preferably 45° with the angle of the spindle. It is this arm that is grasped by the faceting head. Selectively and alternately, in the preferred arrangement, a 90° arm can be used.

With prior-known faceting heads and dops it was necessary that the lap be quite accurately positioned in a position known as "dead true." With prior known faceting heads, if the lap is not dead true, it tends to hit the gem and tries to raise the entire weight of the faceting head. This often results in cracking of the gem. With the dop of this invention having a mounting arm at an angle with dop spindle, the faceting head is not at a critical angle with the gem and the gem can ride up and down with the lap when it is out of true without danger of cracking.

Another and less apparent advantage of the rotating spindle is the facility of which circular scribes can be made; that is, circular scribe marks are used to assist in locating the facet and to assist in obtaining a greatly accurate symmetry that is provided by the mechanism.

Other objects and a fuller understanding of the invention may be had by referring to the following description and claims taken in conjunction with the accompanying drawings in which:

FIGURE 1 is an assembly drawing showing a dop assembly connected to a faceting head and a motor connected to the dop head to rotate the dop stick;

FIGURE 2 is a longitudinal sectional view of the dop assembly in one indexed position;

FIGURE 3 is a sectioned view of the dop assembly showing the indexing pin in a retracted position and another form of dop;

FIGURE 4 is a partially sectioned view of the dop assembly with a novel scribe guide attached and showing how it can be used to form a circular inscription on a gem;

FIGURE 5 is a fragmentary view showing an auxiliary arm connecting the dop assembly; and FIGURE 6 is a sectional view of the device as seen from the plane indicated by the line 6—6 of FIGURE 2.

Referring now to the drawings, in FIGURE 1 the novel and improved dop assembly of this invention is shown with the usual faceting equipment. This faceting equipment includes a faceting head 10 and lap 16. The faceting head 10 has the yoke support, one prong of which is shown and designated as 11. A support arm 12 is journaled for rotating on the yoke and includes an angle indicating pointer 14. The yoke includes angle indicia 13 in visual alignment with the pointer 14. The support arm 12 has a chuck 15, adapted to receive a dop assembly. The dop assembly of this invention is designed to fit conventional faceting equipment.

The novel and improved dop assembly is designated generally as 20 in the drawings. The dop assembly 20 includes a dop stick 21 having a spindle 22 and a gem holding head 23. An elongated, generally-cylindrical housing 24 is provided. The housing 24 has a central axial spindle bore 25. The spindle 22 is journaled in ball bearings 70 for rotation in the spindle bore 25. The dop assembly 20 has a rotatable condition wherein the dop stick is free to rotate within the housing. The dop assembly also has a plurality of selectable positions wherein rotation of the dop stick in the housing is prevented. This selection is obtained with a unique pin and collar construction which permits rotation and indexing between a plurality of non-rotative positions.

The housing 24 includes a pin bore 26 parallel to the spindle bore 25. An elongated headed pin 27 is disposed in the pin bore 26 and axially movable therein. The pin includes a circumferential groove 27a having a flat locking surface 27b. The pin tapers from the locking surface 27b to an abutment surface 27c. A leaf spring 28 is in normally compressive abutment with the pin 27 and has an external loop 29 positioned to allow a force exerted thereon to move the spring 28 out of contact with the pin 27. The pin 27 is axially movable between two operative positions. In the first, or locking position, the lower end of the pin projects from the end of the housing, FIGURE 2. In this position the spring is positioned in the groove 27a and is coactable with the surface 27b to maintain the pin in the locking position. In its second, or retracted position the lower end of the pin is disposed within the confines of the housing, FIGURE 3. The pin is maintained in the retracted position by the spring 28 biased against the pin 27 and abutting the surface 27c. The movement into the locking position is limited by the abutment of a surface 27d with the end of the housing. To move it into the locking position, an axial force is exerted on the pin 27 and it will move axially with its tapered position acting against the spring 28, urging it outwardly until the spring snaps into the groove 27a seating the pin in its locking position. To move the pin 27 into the retracted position, the spring 28 is urged out of contact with the pin 27 and an axial force in the opposite direction is applied and the pin moves. The spring is then allowed to bias into contact with the pin and will limit the movement thereof when it contacts the surface 27c.

A locking collar 30 is provided to coact with the locking pin 27 and is releasably attachable to the spindle 22 by a setscrew 32. The locking collar 30 is positioned between the head 23 and the end of the housing 24 from which the locking pin projects and is closely spaced from the housing for coaction with the pins. The collar 30 has a plurality of circumferentially spaced apertures 31 into which the pin 27 can selectively project one at a time. The number of apertures can be selected according to the needs of the user. A six-apertured collar is shown. This number is merely by way of illustration and the number of apertures required will vary as will become readily apparent.

The dop assembly 20 includes a tensioning spring 36 which surrounds the spindle 22. The spring 36 is interposed between the upper of the two ball bearings 70 and a molded knob 35 which is mounted on the spindle 22. This mounted knob serves several functions. In addition to retaining the spring 36 in a lightly biased condition, it also serves as a convenient hand grip for the facetor when he wishes to hand rotate the dop stick 21. The knob 35 has, as an additional function, a use in urging the indexing pin 27 into an indexed position.

The preferred technique locating the dop assembly 20 in one of its indexed positions is to first elevate the entire assembly free of the lap 16. The chuck 15 on the housing 24 is then grasped in one hand. The knob 35 is grasped in the other and urged downwardly against the action of the spring 36. This both moves the collar 30 away from the housing 24 and pushes the pin 27 downwardly to its indexed position. The knob is then rotated and slowly returned until the pin 27 is located in a selected one of the indexing apertures 31. With the spring 28 positioned in the groove 27a and abutting surface 27b an axial force exerted to move the pin 27 into the retracted position will be resisted. However, when the spring 28 is out of contact with the pin 27, an axial force will move the pin into its retracted position. Thus, to move the pin to the retracted position, the spring 28 is urged out of contact with the pin 27 and the dop stick 21 moved axially so that the collar 30 is spaced from the end of the pin 27. The collar 30 is rotated until the pin 27 is positioned out of alignment with any aperture. The force is then released from the dop stick 21. The spring 36 will urge the dop stick 21 axially in the opposite direction, causing the collar 30 to strike the pin 27 and drive it to its retracted position. It will be recognized that other and convenient locating mechanisms for locking the spindle in an indexed position one at a time can readily be devised and utilized. The preceding description will emphasize that because of its simplicity, the presented indexing mechanism is the disclosed and described mechanism.

The housing 24 has a mounting arm 33 fixed to it. The mounting arm 33 projects outwardly at an angle of preferably 45° with the axis of the spindle 22. Preferably, the axes of the spindle 22 and the arm 33 are in a common plane. The arm 33 is gripped in the chuck 15 and attached to be gripped by any of the usual faceting chucks.

The novel and improved dop assembly can be used to cut gems to any of the conventional shapes and to new and unusual shapes not heretofore obtainable as well. Further, most cutting operations are greatly speeded as will be discussed in greater detail below. The following is a description of how table and crown facets may be cut in the shape which diamonds are usually cut. The number and location of the crown facets are first determined and selected by the facetor. He then mounts the gem to be cut, designated by the reference character 37 on the head 23. The usual sealing wax for softer gems or solder for diamonds may be used to fix the gem to the dop. The dop assembly 20 is mounted on the faceting head 10 by chucking the mounting arm 33 in the chuck 15. The proper angle is selected from the angle indicating indicia 13 and associated pointer 14. The locking pin 27 is then positioned in one of the apertures 31 and the gem is brought into contact with the rotating lap 16. The coaction of the pin and collar prevents any rotation of the dop stick.

For the purpose of this discussion, it will be assumed that there will be six regularly spaced crown facets. In this case, the collar 30 will have six regularly spaced apertures 31. The first of these six facets is cut by bringing the gem 37 into contact with the rotating lap which has been impregnated with an abrasive cutting material suitable to cut the gem. The cutting operation continues until the facet is cut to substantially the desired size. The gem is then taken out of contact with the lap, and pressure is exerted on the mounted knob 35 to move the dop stick, including the collar, axially which will move the aperture and pin out of contact. The dop stick is then rotated to index another aperture with the pin, and pressure is removed from the knob allowing the pin to project into this aligned aperture. The gem is again brought into contact with the rotating lap. This cutting and indexing is repeated until all six facets have been cut.

One of the outstanding features of this invention is the exact positioning obtainable by means of the pin 27 and the apertures 31. If one of the originally formed facets needs additional cutting, the dop stick 21 can be indexed back to the identical setting that had been used initially for that facet, and the additional cutting is performed to obtain the desired size and shape of that facet. The cutting and indexing is continued until the six selected facets have been cut to the facetor's satisfaction. Additional facets may be cut by changing the angle of the gem with the dop, or changing the collar for one with a different number of apertures, or both, enabling the cutting of perfectly symmetrical gem facets with a relative ease not heretofore obtainable.

As was indicated above, this novel and improved dop assembly permits a table facet to be cut in such a manner as to eliminate the well effect. This is accomplished by angling the plane of the intended table facet slightly with the lap and locking the dop stick from rotation as described above. One segment of the table facet is then cut in a manner similar to the cutting of a crown facet. The dop stick is indexed and the cutting continued, until a table facet composed of several segments, each slightly angled, is cut.

A flat table facet of a gem is cut by positioning the dop stick 21 perpendicular to the lap 16 and bringing the gem 37 into contact with the lap with the gem being mounted such that the areas of the intended table facet is parallel to the lap. The dop stick 21 can be locked in place by the pin 27 and the collar 30 or it can be left free to rotate as will be described more fully hereinafter.

With the dop assembly of this invention, the cutting of a cone shape is extremely simple. The angle of the cone is first selected and the gem 37 is mounted on the head 23 so that it will contact the lap 16 in such a position to generate a cone having the selected angle. The pin 27 is in its retracted position leaving the dop stick 21 free to rotate in the spindle bore 25. The dop assembly 20 mounted to the support arm 12 is positioned to bring the gem 37 into contact with the lap 16. As the lap 16 rotates, it will cause the dop stick 21 to rotate in the spindle bore 25. As the dop stick 21 is rotating, a conical shape will be cut on the gem 37.

To increase cutting efficiency it is often desirable to positively drive the dop stick 21 independently of the rotation of the lap 16. This may be accomplished by drivingly connecting the dop stick 21 to a motor 39 as is shown in FIGURE 1. In order to effect this connection, a motor mounting device 40 is provided. The motor mounting device 40 has a support ring 41 which peripherally embraces the outside of the housing 24 and is attached to the housing by a setscrew 42. An L-shaped attaching arm 43 extends from the support ring 41 and terminates at a motor mounting bracket 44. The motor 39 is mounted on the motor bracket 44. The motor 39 includes a motor pulley 45 and the dop stick spindle 22 has a sheave 46 mounted thereon. A flexible belt 47 is reeved over the pulley 45 and the sheave 46 thus drivingly interconnecting the motor and the dop stick, permits the motor 39 to rotate the dop stick independent of any rotation of the lap.

It will be readily apparent to anyone skilled in the art that a myriad of combinations can be obtained by combining the rotational cutting ability of this dop assembly with its indexing ability to cut flat facets. Shapes that have been heretofore difficult or impossible to obtain are obtainable by this novel and improved dop assembly.

As was indicated above—a table facet may be cut with the dop stick located in position or with it free to rotate.

A very high degree of polish can be obtained by leaving the dop stick free to rotate while cutting the table facet and either driving the dop stick with the motor or allowing the rotation to be provided by the spinning of the lap. Conversely, it is possible to disconnect the motor drive on the lap (not shown) and allow the rotation of the dop under power from the motor 39 to cause the lap to rotate.

The ability to rotate the dop stick 21 is especially desirable and useful in cutting diamonds. As was explained above, in cutting diamonds the cutting must take place across the grain of the diamond and the grain is often difficult or impossible to ascertain. A diamond is mounted on the head 23 and brought into contact with a rotating skaif. The dop stick 21 is then rotated by the motor 39. Rotating the diamond will cause the grain to be brought into proper cutting position several times during each rotation of the dop stick, twice for a two-point diamond, three times for a three-point diamond, etc. Thus, the necessity of determining the direction or directions in which the grain runs is obviated and the only skill required is determining the location of the facets on the diamond and aligning the diamond properly with the skaif. Further, this ability may be obtained on all facets either by repositioning the facet normal to the axis of the gem or to provide a means to rotate the dop assembly about the axis of the facet without so repositioning the gem.

Another outstanding advantage of this dop assembly in the diamond cutting trade is in its use in locating the direction of grain in the diamond. When the skaif is properly cutting cross-grain on a diamond, a characteristic and peculiar high-pitched sound is audible. This characteristic sound is not audible if the diamond is cut in a direction which is not cross grain. Thus, a diamond may be mounted on the head 23 with the dop stick 21 left free to rotate. The diamond cutter then rotates the spindle slowly with the diamond against the skaif until the characteristic sound is audible. The diamond is then locked in this position.

Referring now to FIGURE 3, a modification of a dop stick is shown which permits vernier axial adjustment. This adjustable dop stick is referred to generally by the reference character 50. The adjustable dop stick 50 has a sleeve 51 with a through axial bore 52. A dop stem 55 projects into the bore 52 from one end thereof and terminates externally of the bore in a dop stem head 55a and internally in a depressed conical shape 55b. An adjusting pin 56 is disposed in the opposite end of the bore 52 and has a conical shaped end 56b mated to and abutting the end 55b of the dop stem 55. The adjusting pin 56 has a tight running fit in the bore 52 and is freely movable axially within the bore under a force applied axially. An adjusting screw 57 is threaded in the end of the sleeve 51 opposite the end in which the dop stem is positioned and abuts the head of the adjusting pin 56. An annular locking nut 58 is disposed around the sleeve 51 and includes a stem locking screw 59 which is projectible through an aperture 59a formed in the sleeve 51 adjacent the end from which the dop stem 55 projects. In the preferred and disclosed embodiment the locking nut 58 is a modified locking collar. The collar is attached to the sleeve in the same manner it is attached to the dop stick of FIGURE 2 by setscrew 32. This modification of the dop stick provides for axial vernier adjustment of the head 55 with respect to the housing in which it is mounted. As the setscrew 57 is screwed axially into the bore 52, it will force the adjusting pin axially in the bore which will in turn, move the dop stem 55 axially in the bore. The adjustment of the setscrew 57 takes place while the locking screw 59 is loosened permitting axial movement of the dop stem 55. Once the axial position of the dop stem 55 has been adjusted, the locking screw 59 is locked against the dop stem 55 to prevent axial movement in either direction. Thus, the amount of projection or distance of projection of the dop stem is determined by the adjustment of the setscrew 57 and vernier adjustment is possible without removing the dop assembly from the faceting head. In order to make such an adjustment, the only operations that must be performed are a loosening of the locking screw 59 and adjustment of the screw 57 to adjust the position of the dop stem 55 and then the locking of the locking screw 59 against the dop stem 55.

Another use for this dop assembly is shown in FIGURE 4. In gem cutting it is quite often necessary to transcribe a circle indicating the boundary or limits of a cut. This circle is transcribed on the face of the gem and the cut is made to the described circle. This novel and improved dop assembly provides a structure for transcribing a substantially perfect circle on a gem. A transverse threaded bore 60 is formed in the housing 24. The threaded bore 60 is adapted to receive a scribing attachment 61. This scribing attachment includes a shank 62 and a thread at one end 63 and a head 64 at the opposite end. The threaded end 63 is threadably engaged in the threaded bore 60. A hole 65 is formed through the shank, and a coil spring 66 surrounds the shank 62. A scribe support 67 is positioned in the hole 65 and held in place by the spring 66 which is in compressive abutment with the scribe support 67 and the head 64. The scribe support 67 terminates at a scribe support arm 68 suitable as a steady rest for a scribe 69. With this arrangement, a gem is mounted on the head 23 and the scribe 69 is brought into contact with the gem at a desired location. The dop stick 21 is then rotated which rotates the gem 37 causing a circle to be scribed on the gem about its axis of rotation. Another use for the bore 60 is shown in FIGURE 5. There an auxiliary support arm 71 is threaded into the bore. This auxiliary arm 71 is at 90° with the axis of the dop spindle. The arm 71 may be chucked in the faceting head in place of the 45° arm 33.

In order to prevent dust and foreign matter from entering the spindle bore 25 when the scribing apparatus is not in use, a dust cap 72 is provided which is threadably engageable in the cross bore 60 to close the bore and prevent dust from entering the interior of the housing. This cap is easily removable and replaceable.

Another feature of the invention resides in the versatility of the tool. As has been described, either the solid spindle 22 or the adjustable spindle 50 can be readily used in the assembly. Other spindles suitable for many other purposes can be readily substituted. For example, the device may be used as a drill or a turning and beveling attachment may be employed.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dop assembly, comprising, a housing, a dop stick rotatably journaled in said housing, said dop stick having a gem holding head adjacent one end and projecting in one direction from the housing, said dop stick having an opposite end portion projecting oppositely from the housing, an annular collar carried by said stick, said collar having a plurality of circumferentially spaced apertures, said apertures extending axially of said stick, a pin carried by said housing and axially movable therein, said pin having a first end alignable with said aperture and positioned to project into said apertures one at a time when aligned, said pin having a retracted position with said one end disposed in walls of said housing, and biasing means coactable with said pin to retain it in its retracted position.

2. In the device of claim 1, said pin having a groove formed therein, and said biasing means being positioned to reside in said groove when the pin is in the retracted position.

3. In the device of claim 1, the provision of a scribing arm releasably secured to said housing, a scribing attachment carried by said scribing arm and projecting to a position adjacent the gem holding head.

4. A dop assembly, comprising, a cylindrical housing, a dop stick journaled in said housing, said dop stick having a gem holding head adjacent one end and projecting in one direction from the housing, said dop stick having an opposite end portion projecting oppositely from the housing, a sheave carried by said dop, a motor carried by said housing and drivingly interconnected to said sheave, an annular collar carried by said stick, said collar having a plurality of circumferentially spaced apertures, said apertures extending axially of said stick, a pin carried by said sleeve and axially movable therein, said pin having a first end alignable with said apertures and positioned to project into said aperture one at a time when aligned, said pin having a retracted position with said one end disposed in walls of said housing, spring biased means coactable with said pin to releasably lock said pin in its retracted position, whereby when said pin is retracted the motor rotates said stick in said housing.

5. A dop assembly comprising in combination a housing, a mounting arm laterally extending from said housing, a dop stick axially extending through said housing, said dop stick being mounted in said housing for axial and rotative movement, a gem-holding head carried by said dop stick, spring means connected between said housing and said dop stick for urging one end of said dop stick toward said housing, a collar secured to said dop stick between said one end and said housing, said collar including a plurality of radially spaced holes, and pin means carried by said housing, said pin means being movable between an indexing position wherein it is engaged in one of said holes to lock said dop stick in a position of radial adjustment and a retracted position wherein said dop stick is freely rotatable in said housing.

6. A dop assembly comprising:
   (a) a housing;
   (b) an annular sleeve member journaled in said housing for rotation relative thereto;
   (c) a gem holding member having head and stem portions, said head portion being disposed outside said housing and sleeve member, said stem portion being axially movable in said sleeve member for selective axial spacing of said head portion relative to said housing;
   (d) adjustment means operatively interposed between said gem holding and sleeve members, said adjustment means threadably engaging one of said members and engaging the other of said members to adjust said head portion to a selected axial position relative to said sleeve member; and,
   (e) locking means coactable with said stem portion for locking it in selected positions of axial adjustment.

7. A dop assembly comprising:
   (a) a housing;
   (b) an annular sleeve journaled in said housing for rotation relative thereto;
   (c) a gem holding member having head and stem portions, said head portion being disposed outside said housing and sleeve member, said stem portion being axially movable in said sleeve member for selective axial spacing of said head portion relative to said housing;
   (d) adjustment means operatively interposed between said gem holding and sleeve members, said adjustment means including an adjustment screw threadable axially within said sleeve member and engaging said stem portion to selectively position said stem portion in a plurality of axially spaced adjustment positions relative to said sleeve member; and, (e) locking means coactable with said stem portion for locking it in selected positions of axial adjustment.

8. The combination of claim 7 wherein said adjustment means includes an adjustment pin disposed within said sleeve member between said adjustment screw and said stem portion, and said stem portion and said adjustment pin having mating conical end surfaces.

References Cited in the file of this patent

UNITED STATES PATENTS

| | | |
|---|---|---|
| 2,381,833 | Mentzer | Aug. 7, 1945 |
| 2,388,751 | Levy | Nov. 13, 1945 |
| 2,414,598 | Klipper | Jan. 21, 1947 |
| 2,534,384 | Spira | Dec. 19, 1950 |
| 2,542,698 | O'brien | Feb. 20, 1951 |
| 2,542,704 | Rakowitzky | Feb. 20, 1951 |

FOREIGN PATENTS

| | | |
|---|---|---|
| 558,191 | Great Britain | Dec. 24, 1943 |
| 594,729 | France | June 30, 1925 |